United States Patent [19]

Nakamura et al.

[11] Patent Number: 5,422,193
[45] Date of Patent: Jun. 6, 1995

[54] MAGNETIC RECORDING MEDIUM

[75] Inventors: Eitaro Nakamura; Katsuya Nakamura, both of Tokyo, Japan

[73] Assignee: Nippon Zeon Company, Ltd., Tokyo, Japan

[21] Appl. No.: 136,591

[22] Filed: Oct. 12, 1993

Related U.S. Application Data

[63] Continuation of Ser. No. 631,481, Dec. 11, 1990, abandoned.

[30] Foreign Application Priority Data

Dec. 11, 1989 [JP] Japan .................. 1-320891

[51] Int. Cl.$^6$ .............................. G11B 5/00
[52] U.S. Cl. ................... 428/694 BG; 428/425.9; 428/522; 428/694 B; 428/694 BA; 428/900
[58] Field of Search ............. 428/694, 900, 425.9, 428/694 B, 694 BG, 694 BA, 522

[56] References Cited

U.S. PATENT DOCUMENTS

| | | | |
|---|---|---|---|
| 4,501,795 | 2/1985 | Takeuchi et al. | 428/329 |
| 4,529,649 | 7/1985 | Takeuchi et al. | 428/328 |
| 4,529,661 | 7/1985 | Ninomiya et al. | 428/425.9 |
| 4,585,697 | 4/1986 | Kato et al. | 428/403 |
| 4,613,545 | 9/1986 | Chubachi et al. | 428/328 |
| 4,885,208 | 12/1989 | Araki et al. | 428/403 |
| 4,937,098 | 6/1990 | Nishikawa et al. | 427/132 |
| 4,937,151 | 6/1990 | Yasuhara et al. | 428/694 |

FOREIGN PATENT DOCUMENTS

| | | |
|---|---|---|
| 60-238306A | 11/1985 | Japan . |
| 60-238309A | 11/1985 | Japan . |
| 60-238371A | 11/1985 | Japan . |
| 63-121117A | 5/1988 | Japan . |
| 60235814A | 5/1989 | Japan . |

*Primary Examiner*—Stevan A. Resan
*Attorney, Agent, or Firm*—Wenderoth, Lind & Ponack

[57] ABSTRACT

The present invention provides a magnetic recording medium excellent in S/N ratio and durability. The magnetic recording medium is characterized in that a magnetic powder having a relative surface area of at least 35 m$^2$/g and an average adsorption of myristic acid of up to 0.5 mg/m$^2$ in methylethylketone solution of an average concentration of 0.6 g/100 ml, on the one hand, and a magnetic layer comprising a bond having at least one hydrophilic group selected from among $SO_3M$, $SO_4M$, $PO_4M_2$ and $N^+R^1R^2R^3X^-$ and at least one reactive group selected from among hydroxide group, thiol group, amino group and epoxy group, on the other hand, is bridged by at least one briding agent selected from among polyisocyanate, polyamine and polythiol.

8 Claims, No Drawings

MAGNETIC RECORDING MEDIUM

This application is a continuation application of U.S. Ser. No. 07/631,481, filed Dec. 11, 1990, now abandoned.

FIELD OF THE INVENTION

The present invention relates to a magnetic recording medium, and more particularly, to a magnetic recording medium with an excellent S/N ratio and a satisfactory durability.

PRIOR ART

A recording medium such as a magnetic tape has generally been manufactured by coating a non-magnetic substrate such as a polyester film or a polyimide film with a magnetic paint containing a magnetic powder, binding components, and various other additives.

More recently, a finely pulverized magnetic powder having high coercive force and saturated magnetization has become used for these magnetic recording media along with the increasing demand for the improvement of the recording density and the S/N ratio with a view to achieving more compact magnetic recorder and media with higher performance. In order to obtain a high-density magnetic recording medium with a high output and an excellent S/N ratio, it is necessary to form a thin-film magnetic layer having satisfactory surface properties uniformly and densely filled with a fine magnetic powder having a high magnetic energy on a non-magnetic substrate, and for this purpose, uniform dispersion of the magnetic powder is an important prerequisite.

On the other hand, however, dispersion of the magnetic powder into solvent is more difficult as the magnetic energy of the magnetic powder becomes higher and particles of the powder become finer, with a resultant increased viscosity of the paint, so that the orientation and packing property of the magnetic layer available by applying such a paint tend to decrease, and the purpose of obtaining a high-output and high-density medium excellent in durability cannot be achieved.

To solve this problem, proposals have been made to increase dispersibility by surface treating magnetic powder, including, for example, treating methods using a silane coupling agent (Japanese Patent Provisional Publication No. 59-129,938; Japanese Patent Provisional Publication No. 58-155,703); treating methods using a titanium coupling agent (Japanese Patent Provisional Publication No. 56-111,129; Japanese Patent Provisional Publication No. 62-275,314; Journal of Polymers, vol. 45, No. 12, pp. 985–991 (1988)); and treating methods using a surfactant (Japanese Patent Provisional Publication No. 57-198,606; Japanese Patent Provisional Publication No. 57-56,330; Japanese Patent Provisional Publication No. 59-48,828; and Japanese Patent Provisional Publication No. 63-253,531).

These methods increase affinity to a solvent by making the surfaces of magnetic powder particles lipophilic, thereby basically promoting dispersion of a bond resin which is lipophilic, and decreasing, as a result, the equilibrium adsorption of fatty acid used as a reference for measuring the hydrophilicity of surfaces of magnetic powder particles after treatment. Use of the treated magnetic powder leads to better wetting with an organic solvent and permits achievement of a low-viscosity magnetic paint in which magnetic powder particles are dispersed even when using a binder which does not contain active hydrogen such as vinyl chloride vinyl acetate copolymer, vinyl chloridinylidene chloride copolymer, ordinary polyurethane resin or acrylonitrile-butadiene copolymer. However, because the binder does not contain active hydrogen, a bridge of the magnetic film is not formed by such substances as a polyisocyanate compound, and this tends to cause durability trouble.

When using, on the other hand, a binder containing active hydrogen, which has conventionally been employed as an established bond, such as vinyl chloride-vinyl acetate-vinyl alcohol ternary copolymer resin, vinyl chloride-vinyl acetate-maleic acid ternary copolymer resin, or polyurethane resin, butyric resin or phenoxy resin containing hydroxide group, the reduced hydrophilic portion of the surfaces of magnetic powder particles prevents active hydrogen groups in the bond from being caught on the magnetic powder surface, resulting in reduced adsorption of the bond into the magnetic powder. The resultant increased hydrogen bond concentration between active hydrogen groups of the binder in the paint causes decrease in dispersibility and dispersion stability, and thus a magnetic paint with only a slight degree of viscosity drop is available in many cases.

While these problems have not been so apparent for a relatively large particle size of magnetic powder and a specific surface area of up to approximately 30 $m^2/g$, these problems cannot be disregarded for a very fine magnetic powder of a specific surface area over 35 $m^2/g$, particularly one reaching 60 $m^2/g$.

SUMMARY OF THE INVENTION

The present invention was made in view of the circumstances as described above and has therefore an object to provide a magnetic recording medium which solves the defects of the conventional magnetic recording medium, uses a fine magnetic powder subjected to a lipophilization treatment, is coated with a low-viscosity magnetic paint in which magnetic powder particles are uniformly dispersed, packed densely with magnetic powder, has an excellent surface smoothness, comprises a uniform thin-film magnetic layer and is excellent in durability for high-density recording.

More specifically, the present invention provides a magnetic recording medium, which solves the problems as described above, characterized in that a magnetic powder having a relative surface area of at least 35 $m^2/g$ and an average adsoption of myristic acid of up to 0.5 $mg/m^2$ in methylethylketone solution of an average concentration of 0.6 g/100 ml, on the one hand, and a magnetic layer comprising a binder having at least one hydrophilic group selected from among $SO_3M$, $SO_4M$, $PO_4M_2$ and $N^+R^1R^2R^3X^-$ (where M is hydrogen, ammonium or an alkali metal; $R^1$, $R^2$ and $R^3$ are respectively an alkyl group; and X is an anion) and at least one reactive group selected from among hydroxide group, thiol group, amino group and epoxy group, on the other hand, is bridged by at least one bridging agent selected from among polyisocyanate, polyamine and polythiol.

DETAILED DESCRIPTION OF THE INVENTION

As the magnetic powder used in the present invention, for example, an oxide magnetic powder such as $\gamma\text{-}Fe_2O_3$, $FeO_x$ ($1.33 < x < 1.5$), $Fe_3O_4$, Co-adhering $\gamma\text{-}Fe_2O_3$, Co-adhering $FeO_x$ ($1.33 < x < 1.5$), Co-adhering $Fe_3O_4$, barium ferrite, strontium ferrite, and $CrO_2$, as well as a metallic magnetic powder such as Fe, Co or Fe-Ni can be used, and the particle shape may be any of the accicular, hexagonal laminar, laminar, granular and rice-grain-like shapes.

The magnetic powder of the present invention should be, as described above, a fine magnetic powder having a specific relative surface area of over 35 $m^2/g$. When a relatively large magnetic powder having a surface area of under 35 $m^2/g$ is used, a sufficient S/N ratio of the medium is not available. The magnetic powder should preferably be subjected to a surface treatment to make it lipophilic to an equilibrium adsorption of up to 0.5 $mg/m^2$ of myristic acid in methylethylketone with an equilibrium concentration of 0.6 g/100 ml. Applicable agents for this treatment include, for example, an organic silane compound having hydrolytic alkoxysilane group in the molecule.

Example of such an organic silane are as follows:

$(CH_3)_2Si(OCH_3)_2$ $CH_2=CHSi(OC_2H_5)_3$ $CH_2=C(CH_3COOC_2H_4Si(OCH_3)_3$ $H_2NC_2H_4NHC_3H_6Si(OCH_3)_3$ $H_2NC_2H_4NHC_3H_6Si(CH_3)(OCH_3)_2$ $H_2NC_3H_6Si(OC_2H_5)_3$ $H_2NCONHC_3H_6Si(CO_2H_5)_3$

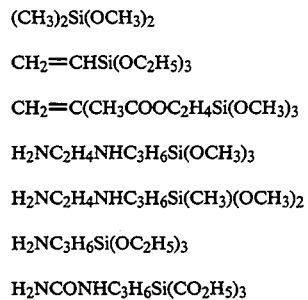

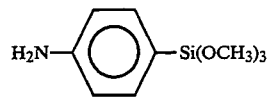

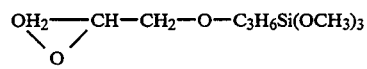

$(C_2H_5O)_3SiC_3H_6NHCONHC_6H_{12}NCO$, $(CH_3O)_3SiC_2H_4NHC_2H_4NHCONHC_6H_{12}NCO$,

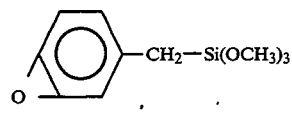

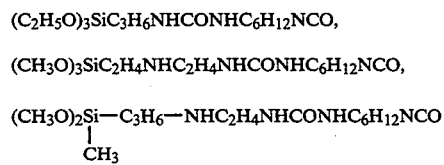

The reaction product of 1 mol of phenyl or alkyltrialkoxysilane and 1 to 2 mols of long-chain fatty acid is another example.

An organic titanium compound may also be used as such a treatment agent to achieve lipophilicity. For example:

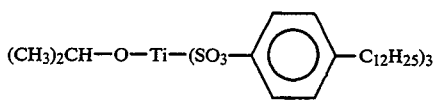

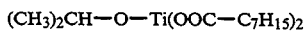

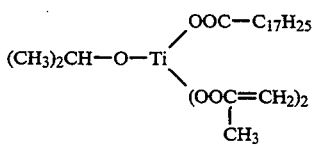

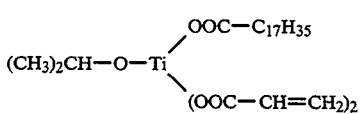

$(CH_3)_2CH-O-Ti-(OC_2H_4NHC_2H_4NH_2)_3$

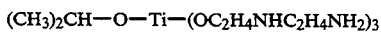

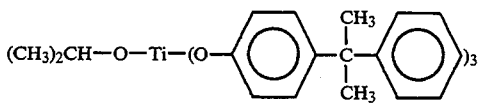

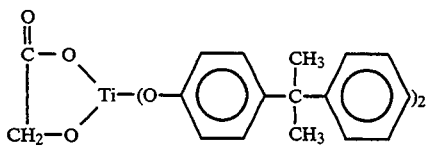

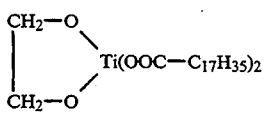

In addition, the compound known as KEN-REACTOR (made by Kenrich Petrochemicals, Inc.) may also be used.

An organic aluminium compound is also applicable as such an agent. For example:

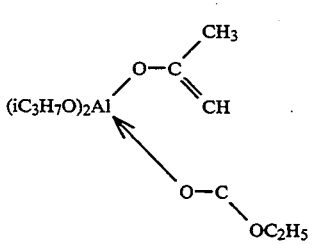

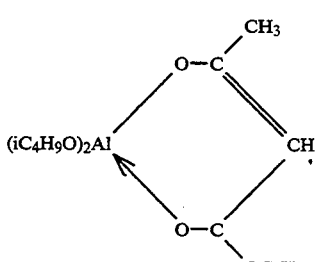

When treating the magnetic powder with the use of these compounds, it is the usual practice to dissolve or disperse these compounds in a solution of an organic solvent or water, mixing the magnetic powder, and then remove the liquid or dry the mixture as it is.

A surfactant may also be employed. Examples include: lecithin, hydroxylated lecithin, alkyl acid phosphate, polyalkyl acid phosphate, allyl acid phosphate, polyoxyalkylenealkylphenyl acid phosphate, and dialkyl sulfosuccinic acid and dodecyl benzene sulfonic acid and their metal salts.

For the treatment to achieve lipophilicity, furthermore, it is possible to use a compound containing at least one functional group selected from among epoxy, carboxyl, hydroxyl, thiol and amino groups, and a hydrocarbon with eight or more pethylene chains. Examples include: α-olefin oxides having a carbon number of 10 to 30 such as 1,2-epoxydodecan and 1,2-epoxyhexadecan; epoxylated unsaturated alcohols and epoxylated unsaturated acids such as epoxylated oleil alcohol, epoxylated 10-undecenol and epoxylated oleic acid, saturated or unsaturated fatty acids such as lauric acid, myristic acid, palmitic acid, stearic acid, oleic acid, and 10-undecenoic acid; hydroxy acids such as ω-hydroxylauric acid, ω-hydroxypalmitic acid, phellonic acid, and hydroxystearic acid; keto acids such as 2-ketolauric acid, and 8-ketostearic acid; hydroxy compounds such as laurylalcohol, stearylalcohol, oleilalcohol, 10-undecenol-1,nonanediol, and 2-hydroxyethyllaurylether; thiol compounds such as dodecylmercaptan, and dodecylbenzenethiol; and amino compounds such as stearylamine, dimethylstearylamine, distearylamine, methyldistearylamine, aminostearylalcohol, aminostearic acid, and α-aminolauric acid.

These compounds are suitably used by a method comprising mixing with the magnetic powder under an oxygen partial pressure of up to 10 mmHg and heating to a temperature of from 120° to 250° C., with a view to causing a reaction with the active point on the magnetic powder surface by means of functional groups. When there are two or more functional groups, at least one functional group reacts with the magnetic powder surface, and the remaining functional groups react with the bridging agent in the magnetic paint and thus form a firm magnetic layer. This method is therefore preferable.

The consumption of compounds used for the treatment to make the surface lipophilic may vary within the range of from 0.2 to $2.0 \times 10^{-3}$ g/m³, depending upon the molecular weight and the BET specific surface area. With a consumption of compounds smaller than this, a desired effect cannot be expected. When the consumption is over this range, in contrast, the fraction not reacting with the magnetic powder surface increases and tends to cause such inconveniences as a lower dispersion stability, softening of the magnetic layer, and leaching to the magnetic layer surface.

The magnetic powder treated as above to achieve lipophilicity is formed into a magnetic layer by means of the binder of the present invention, and as the binder used at this step, a resin containing at least one hydrophilic group selected from among $SO_3M$, $SO_4M$, $PO_4M_2$, and $N^+R^1R^2R^3X^-$ (where M is hydrogen, ammonium or an alkali metal; and are $R^1$, $R^2$, $R^3$ are respectively an alkyl group; and X is an anion) and at least one reactive group selected from among hydroxy group, thiol group, amino group and epoxy group is suitably used, as described above, which has a molecular weight of at least 10,000 and up to 100,000. With a molecular weight of under 10,000, calendar contamination tends to occur when carrying out a surface forming treatment of the magnetic layer, and mechanical strength of the magnetic layer tends to decrease. With a molecular weight of over 100,00, on the other hand, viscosity of the magnetic paint tends to increase, with a decreased dispersion of the magnetic powder, thus making it difficult to achieve the object of the present invention.

The content of the hydrophilic group in the resin should preferably be within a range of from $3.0 \times 10^{-5}$ to $5 \times 10^{-4}$ mol/g. A content lower than this results in an insufficient dispersion, and a content higher than this tends to exert an adverse effect, for example, on humidity resistant operability of the resultant magnetic recording medium.

Such a resin as the binder is required to contain, in addition to the above-mentioned hydrophilic group, at least one reactive group necessary for converting the magnetic layer into a bridged film through reaction with a bridging agent, for the purpose of improving heat resistance and durability of the medium, and hydroxy group, thiol group, amino group and epoxy group are essential as such reactive groups.

When active hydrogen is contained, the content of these reactive groups should preferably be within a range of from $1 \times 10^{-4}$ to $10 \times 10^{-4}$ mol/g. A lower content tends to give insufficient bridging, and a higher content results in more active interaction between reactive groups and may cause a decrease in dispersibility by increasing viscosity of the magnetic paint or inhibiting adsorption of binder to the magnetic powder.

For an epoxy group, even an excessively high content does not cause major inconveniences; it suffices to be at least $1 \times 10^{-4}$ mol/g.

Examples of the binder resin applicable in the present invention as described above are presented, for vinyl chloride resins, in Japanese Patent Provisional Publication No. 60-235,814, Japanese Patent Provisional Publication No. 60-238,306, Japanese Patent Provisional Publication No. 60-238,309, Japanese Patent Provisional Publication No. 60-238,716, and Japanese Patent Provisional Publication No. 63-121,117, and for polyurethane resins, in Japanese Patent Provisional Publication No. 59-108,023, Japanese Patent Provisional Publication No. 61-133-012, and Japanese Patent Provisional Publication No. 61-198,417.

In the present invention, a resin not containing a hydrophilic group, which has conventionally been used as a binder, may also be used in addition to the above-mentioned binder having hydrophilic groups. Examples include: vinyl chloride resins such as vinyl chloride-vinyl acetate-vinyl alcohol ternary copolymer, and vinyl chloride-vinyl acetate-maleic-acid ternary copolymer; butadiene rubbers such as nitrocellulose, phenoxy resin, polyester resin, polyurethane resin, acrylonitrile-butadiene copolymer, and acrylonitrile-butadiene-methacrylic acid copolymer. It is not desirable to use these binders in an amount in excess of a half the total consumption of all the binders.

A larger consumption of binder leads to a better durability of the resultant medium, whereas, because the binder is a nonmagnetic material, the consumption should preferably be the smallest possible for the purpose of increasing the ratio of magnetic powder in the magnetic layer, i.e., it is desirable to obtain a high adhesion with the use of the smallest possible consumption. The binders used in the present invention enable this. In general, the ratio of the binder should account for 10 to 30 weight parts, or more preferably, 15 to 20 parts relative to 100 weight parts of magnetic powder.

For bridging the magnetic layer through reaction between such a binder and reactive groups, the present invention uses at least one bridging agent selected from among polyisocyanate, polyamine and polythiol, and particularly polyisocyanate most suitably. Examples of polyisocyanate compounds include: trimethylolpropane adduct of trylenediisocyanate, trimer of hexamethylene-diisocyanate, trimethylolpropane adduct, burette reactant, and polymethylenepolyphenylisocyanate.

As polyamine, those usually used as amine curing agents of epoxy resin may be used. Examples include: primary or secondary amine such as triethylenetetramine and diethylenetriamine, and tertiary amine such as 2, 4, 6-tri(dimethylaminomethyl)phenol. As polythiol, applicable ones include, in addition to those used as curing agents of epoxy resin, triazine compounds such as dibutylaminothiol-s-triazine.

Two or more of these bridging agents may be mixed. The amount should be 2 to 10 weight parts and more preferably 3 to 5 parts relative to 100 parts of magnetic powder.

To ensure satisfactory running properties, it is desirable that the magnetic layer should contain a slip agent. As this slip agent, those conventionally used may be used. Examples include: fatty acids such as myristic acid and stearic acid; fatty acid esters such as butyl stearate; and silicone oil, fatty acid amide, carbon black, graphite, molybdenum oxide, and molybdenum sulfide.

Applicable as the abrasive are the usual compounds, for example, aluminium oxide, silicon carbide, chromium oxide, titanium black and corundum.

Carbon black is applicable for antistatic purposes and to ensure necessary shading properties. For antistatic purposes, a surfactant, particularly quaternary ammonium salt type and a nonionic surfactant may be used.

The total amount of these non-magnetic components should preferably be up to 25% in weight percentage in the magnetic layer.

The magnetic powder and the non-magnetic components described above are treated in multiple stages in an organic solvent by means of a kneader/disperser such as a kneader, a sand mill or a ball mill to prepare a dispersed paint. The paint is then uniformly coated onto a non-magnetic substrate comprising a polyester film such as polyethylene terephthalate, polyethylene naphthate or a polyimide film. After application of an orientation (non-orientation) treatment, drying and surface forming treatment and bridge curing, the coated substrate is cut into prescribed dimensions, and incorporated into a cassette or a jacket to form a recording medium. Solvents applicable in this process include mainly ketones such as cyclohexane, methylethylketone, and methylisobutylketone, and esters such as ethyl acetate and butyl acetate and/or aromatic hydrocarbon such as toluene may also be used in mixture.

It is needless to mention that embodiments of the magnetic recording medium of the present invention are not limited to those described above, but may be in any of the different and various other manners.

According to the magnetic recording medium of the present invention, it is possible to uniformly disperse a fine magnetic powder, capable of having strong magnetic energy, into a solvent by combining the magnetic powder, the bond and the bridging agent in a particular manner, and the magnetic layer made available by the magnetic paint excellent in dispersion stability and paintability in the form of a uniform thin film has a high packing ratio of magnetic powder so that the volume ratio exceeds 33%.

The recording medium of the present invention comprising such a magnetic layer permits high-density recording with an excellent S/N ratio and exhibits excellent durability.

The magnetic recording medium of the present invention is described below in more detail by means of examples. In the description hereafter, the words "parts" and "%" are used in terms of weight unless otherwise specified.

(Treatment of magnetic powder)

Treatment 1

First, 100 parts of cobalt-adhering iron oxide magnetic powder (BET relative surface area: 46 m$^2$/g; coercive force: 650 Oe) (Sample A') and 3.0 parts of epoxylated oleylalcohol were put in a vacuum stirring tank with jacket. After reducing the pressure in the tank to 25 mmHg, stirring was started and the mixture was heated.

For an hour after the tank interior temperature reached 230° C., this temperature was held, and then the tank was cooled. During this period, the inner pressure of the tank was kept at 5 to 8 mmHg.

After sufficient cooling the treated magnetic powder (sample A) was taken out.

This magnetic powder was subjected to methanol extraction in a Soxhlet extractor for eight hours, resulting in an amount of extraction of 0.2%.

Measurement with a methylethylketone solution gave an amount of equilibrium adsorption of myristic acid of 0.28 mg/m$^2$ at an equilibrium concentration of 0.6 g/100 ml (hereafter simply called the "amount of equilibrium adsorption").

Treatment 2

Sample A' as used in Treatment 1 in an amount of 150 g was placed in a 500-ml separable flask; 300 g of toluene, 1.5 g of an organic silane compound:

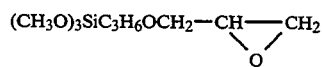

and 4 g of laurylazide phosphate:

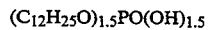

and the mixture was stirred for two hours at a temperature of 75° to 85° C.

Then, the magnetic powder was separated by removing the liquid, rinsed several times with toluene, and toluene was removed while keeping a temperature of 60° C. under a reduced pressure, thus obtaining a magnetic powder (sample B). The magnetic powder (sample B) had an amount of equilibrium adsorption of 0.21 mg/m$^2$.

Treatment 3

Using the following organic titanium compound in place of the organic silane compound, a treatment identical with Treatment 2 was applied to obtain another magnetic powder (sample C). The magnetic powder (sample C) had an amount of equilibrium adsorption of 0.4 mg/m$^2$:

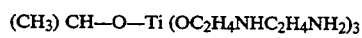

[Preparation of recording medium]

Examples 1 to 3

Using the magnetic powders (Samples A to C) made available by the above-mentioned treatments, a mixture having the following chemical composition:

Magnetic powder: 100 parts
Vinyl chloride series binder: 10
Carbon black: 1 to 3
Alumina: 4
Myristic acid: 1
Mixed solvent: 80
(methylethylketone: cyclohexanone: toluene=1:1:1)
was mixed and kneaded by adding mixed solvent equally divided into two, and then dispersed by adding 30 parts of mixed solvent in a sand mill. Subsequently, after adding:

Polyurethane series binder: 8 parts
Silicone oil: 1.5
Mixed solvent: 42,
the mixture was dispersed again; finally, 4 parts of trylendiisocyanate trimethylolpropane adduct: Colonate L (made by Nippon Polyurethane Co., Ltd) and 30 parts of mixed solvent were added and the mixture was mixed with a disperser to prepare a magnetic paint.

The resultant paint was passed through a filter and applied onto a polyester film so as to give a thickness of 4.0 μm after drying, oriented and dried. Thereafter, the coated film was pressed by a calendar roll eight times to form a surface, cured at a temperature of 60° C. for 24 hours, cut into widths of ½ inch, and wound into a VHS cassette to form a video tape.

Properties of each tape were measured and evaluated pursuant to the following specifications;

(a) Viscosity of magnetic paint:
  Measured at a temperature of 23° C. under conditions including rotor #4 and 30 rpm by the use of a Brookfield-type rotary viscometer.

(b) Gloss of magnetic paint:
  Gloss of the coated film before calendar treatment was measured at an angle of incidence of 60° by means of a GM-3D-type glossmeter manufactured by Murakami Color Technology Laboratory.

(c) Magnetic properties:
  The video tape was measured with an external magnetic field of 5 kOe by means of a magnetic property meter VSM-7P type manufactured by Toei Kogyo Co., Ltd.

(d) Electromagnetic conversion property:
  The S/N ratio was measured by means of a VHS deck.

(e) Durability:
  In the still mode on the VHS deck, the time required for output to reach the initial one−2 dB was measured.

The results of these tests are shown in Table 1: the recording medium of the present invention shows high packing property and orientation, has an excellent S/N ratio and is excellent also in durability.

Example for comparison 1 and 2

For comparison purposes, Samples A and A' were used as the magnetic powder, and video tapes were prepared in the same manner as in Examples 1 to 3 so as to give the compositions as shown in Table 1 to evaluate properties thereof.

Properties were inferior to those of the Examples.

The result are shown also in Table 1

TABLE 1

| Test No. | Example 1 | Example 2 | Example 3 | Example for comparison 1 | Example for comparison 2 |
| --- | --- | --- | --- | --- | --- |
| Magnetic powder sample | A | B | C | A' | A |
| Vinyl chloride series binder | V-1 | V-1 | V-1 | V-1 | V-2 |
| Polyurethane series binder | U-1 | U-1 | U-1 | U-1 | U-2 |
| Amount of carbon black | 1 | 3 | 3 | 3 | 1 |
| Magnetic paint viscosity (cps) | 1100 | 1300 | 1300 | 2000 | 2200 |
| Magnetic film gloss (%) | 130 | 132 | 128 | 120 | 67 |
| Magnetic properties | | | | | |
| Bm (Gauss) | 1810 | 1750 | 1720 | 1720 | 1820 |
| Br (Gauss) | 1630 | 1540 | 1510 | 1430 | 1430 |
| Rs (−) | 0.89 | 0.88 | 0.88 | 0.83 | 0.79 |
| Hc (Oe) | 750 | 680 | 680 | 685 | 740 |
| Electromagnetic conversion property (dB) | +1.6 | +0.6 | +0.6 | 0 | −0.4 |
| Durability (hours) | >2 | >2 | >2 | <2 | 1.0 |

(Note)
V-1: $SO_4K$-containing vinyl chloride resin
  ($M_W$: 32,000, $SO_4K$: $9 \times 10^{-5}$ mol/g,
  OH: $3 \times 10^{-4}$ mol/g,
  Epoxy: $7 \times 10^{-4}$ mol/g)
V-2: Vinyl chloride-vinyl acetate-vinyl alcohol ternary copolymer
  ($M_W$: 40,000, OH: $13 \times 10^{-4}$ mol/g)
U-1: $SO_3Na$-containing polyurethane
  ($M_W$: 50,000, $SO_3Na$: $10 \times 10^{-5}$ 5 mol/g)
  OH: $2 \times 10^{-4}$ mol/g)
U-2: OH-containing polyurethane
  ($M_w$: 54,000, OH: $13 \times 10^{-4}$ mol/g)

Examples 4 to 8

Tapes were prepared in the same manner as in Example 1, except that the vinyl chloride series binder and the polyurethane series binder were replaced by a resin having $PO_4Na_2$ and $N^+(CH_3)_4.Cl^-$ as the hydrophilic group and amino group and thiol group as reactive groups, and the resultant properties were evaluated.

The properties observed were almost equally excellent.

The results include a magnetic paint viscosity of 1120 to 1250 cps, a value of Gloss of 125 to 130%, an electromagnetic property of +0.6 to +1.4 dB, and a durability of longer than two hours.

According to the present invention, as described above in detail, a magnetic recording medium excellent in S/N ratio and durability is provided.

What is claimed is:

1. A magnetic recording medium in which a magnetic powder is uniformly dispersed in a binder, said binder having at least one hydrophilic group selected from the group consisting of $SO_3M$, $SO_4M$, $PO_4M_2$ and $N^+R^1R^2R^3X^-$, where M is hydrogen ammonium or an alkali metal, $R^1$, $R^2$ and $R^3$ are respectively an alkyl group and X is an anion; and at least one reactive group selected from the group consisting of a hydroxide group, a thiol group, an amino group and an epoxy group, wherein the total amount of the hydrophilic group(s) in the binder is in the range of from $3.0 \times 10^{-5}$ to $5 \times 10^{-4}$ mol/g and wherein the amount of the hydroxide, thiol and amino reactive group(s) in the binder, when present, is in the range of from $1 \times 10^{-4}$ to $10 \times 10^{-4}$ mol/g, and wherein the amount of the epoxy in the binder, when present is at least about $1 \times 10^{-4}$ mol/g; said magnetic powder being chemically bonded to the reactive groups of said binder through at least one bridging agent selected from the group consisting of a polyisocyanate, a polyamine and a polythiol compound, said magnetic powder having a relative surface area of at least 35 m²/g and an average adsorption of myristic acid of up to 0.5 mg/m² in a methylethylketone solution of an average concentration of 0.6 g/100 ml.

2. A magnetic recording medium according to claim 1 in which the bridging agent is a polyisocyanate selected from the group consisting of a trimethylolpropane adduct of trylenediisocyanate, a trimer of hexamethylene diisocyanate, and polymethylenepolyphenylisocyanate.

3. A magnetic recording medium according to claim 1 in which the binder is present in an amount of 10 to 30 weight parts relative to 100 weight parts of the magnetic powder and the bridging agent is present in an amount of 2 to 10 weight parts to 100 weight parts of magnetic powder.

4. A magnetic recording medium according to claim 1 in which the magnetic recording medium is in the form of a layer in which the magnetic powder and bridging agent are uniformly dispersed in the binder.

5. A magnetic recording medium in which a magnetic powder is uniformly dispersed in a binder, said binder having at least one hydrophilic group selected from the group consisting of $SO_3M$, $SO_4M$, $PO_4M_2$ and $N^+R^1R^2R^3X^-$, where M is hydrogen, ammonium or an alkali metal, $R^1$, $R^2$ and $R^3$ are respectively an alkyl group and X is an anion; and at least one reactive group selected from the group consisting of a hydroxide group and an epoxy group, wherein the total amount of the hydrophilic group(s) in the binder is in the range of from $3.0 \times 10^{-5}$ to $5 \times 10^{-4}$ mol/g and wherein the amount of the hydroxide reactive group in the binder, when present, is in the range of from $1 \times 10^{-4}$ to $10 \times 10^{-4}$ mol/g, and wherein the amount of the epoxy in the binder, when present, is at least about $1 \times 10^4$ mol/g; said magnetic powder being chemically bonded to the reactive groups of said binder through at least one bridging agent selected from the group consisting of a polyisocyanate, a polyamine and a polythiol compound, said magnetic powder having a relative surface area of at least 35 m²/g and an average adsorption of myristic acid of up to 0.5 mg/m² in a methylethylketone solution of an average concentration of 0.6 g/100 ml.

6. A magnetic recording medium according to claim 5 in which the bridging agent is a polyisocyanate selected from the group consisting of a trimethylolpropane adduct of trylenediisocyanate, a trimer of hexamethylene diisocyanate, and polymethylenepolyphenylisocyanate.

7. A magnetic recording medium according to claim 5 in which the binder is present in an amount of 10 to 30 weight parts relative to 100 weight parts of the magnetic powder and the bridging agent is present in an amount of 2 to 10 weight parts to 100 weight parts of magnetic powder.

8. A magnetic recording medium according to claim 6 in which the magnetic recording medium is in the form of a layer in which the magnetic powder and bridging agent are uniformly dispersed in the binder.

* * * * *